Oct. 28, 1969  G. V. WOODLING  3,474,964
ACTUATING MECHANISM FOR A ROTARY DEVICE
Filed Dec. 14, 1967

INVENTOR.
GEORGE V. WOODLING
BY
Woodling, Krost, Granger and Rust
attys.

United States Patent Office 3,474,964
Patented Oct. 28, 1969

3,474,964
ACTUATING MECHANISM FOR A
ROTARY DEVICE
George V. Woodling, 22077 W. Lake Road,
Rocky River, Ohio 44116
Filed Dec. 14, 1967, Ser. No. 691,684
Int. Cl. F16k 1/22, 41/00; F03g 7/06
U.S. Cl. 236—101
3 Claims

ABSTRACT OF THE DISCLOSURE

Subject disclosure relates to an actuating mechanism for a rotary device having a housing and rotary means mounted therein and features a butterfly valve element as the rotary means actuated by a bimetallic coil having an inner end and an outer end thermally movable relative to each other with temperature changes. The outer end of the coil is adjustably stationary and the inner end is disposed to turn the butterfly valve element within the valve housing. Mounted to the inner (power output) end of the bimetallic coil is a universal drive from which extends a wire-shaft connected to the butterfly valve element. The wire-shaft is resistingly twistable whereby the rotary butterfly valve element may be adjustably positioned in an angular direction with respect to the inner power output end of the bimetallic coil. The outer (positionably stationary) end of the coil is connected to the inside of a hollow sleeve which, in turn, is mounted for adjustable rotation with respect to the valve housing in which the butterfly valve element is mounted, whereby the butterfly valve element may be adjustably positioned in an angular direction within the valve housing upon rotation of the hollow sleeve. Stop means are provided for limiting the thermal movement of the bimetallic coil. The actuating mechanism may be mounted to a sub-plate which, in turn, may be removably fastened to the valve housing, whereby the sub-plate and the actuating mechanism may be bodily removed as a unit from the valve housing. A fluid seal is provided for the wire-shaft and comprises a plastic body provided with a shaft-bore in which the shaft-bore has substantially a cylindrical inner surface self-matching the diameter of the wire. The plastic body is preferably Teflon and has a marginal peripheral body portion sealingly connected to said valve housing by O-ring means.

My invention relates to an actuating mechanism for a rotary device and more particularly to an actuating mechanism for a butterfly valve element mounted in a valve housing.

One use of a butterfly valve is to control or regulate the flow of gas to a burner.

An object of my invention is to actuate the butterfly valve element by a bimetallic coil.

Another object is to adjustably position the angular relationship of the butterfly valve element with respect to the power output end of the bimetallic coil.

Another object is to make the shaft that turns the butterfly valve element of a piece of wire, preferably stainless steel, having a diamter residing in a range from approximately .025 to .075 of an inch.

Another object is to provide for interconnecting the inner power output end of the bimetallic coil to the butterfly valve element by a resistingly twistable wire-shaft, whereby the wire-shaft may be twisted to adjustably position the butterfly valve element in an angular direction with respect to the inner power output end of the bimetallic coil.

Another object is to adjustably mount the outer stationary positionable end of the bimetallic coil for rotation relative to the valve housing, whereby the butterfly valve element may be adjustably positioned in an angular direction within the valve housing.

Another object is to provide stop means for limiting the thermal movement of the bimetallic coil.

Another object is to provide for connecting the outer end of the bimetallic coil to the inside of a hollow sleeve.

Another object is to provide for mounting the bimetallic coil inside of a hollow sleeve with the latter being adjustably positionable in an angular direction with respect to the valve housing.

Another object is to provide for mounting the hollow sleeve for rotational movement with respect to the valve housing.

Another object is to provide a universal drive between the inner power output end of the bimetallic coil and the butterfly valve element.

Another object is to mount the actuating mechanism to a sub-plate which, in turn, may be removably fastened to the valve housing, whereby the sub-plate and the actuating mechanism may be bodily removed as a unit from the valve housing.

Another object is the provision of a fluid seal for the wire-shaft.

Another object is to provide a fluid seal for the wire-shaft including a shaft-bore having substantially a cylindrical inner surface self-matching the diameter of the wire.

Another object is the provision of a plastic body provided with a shaft-bore in which the shaft-bore has substantially a cylindrical inner surface self-matching the diameter of the wire and in which the plastic body has a marginal peripheral body portion sealingly connected to the valve housing by O-ring means.

Other object and a fuller understanding of the invention may be had by referring to the following description and claims, taken in conjunction with the accompanying drawings, in which:

FIGURE 8 is a fragmentary view of the inner power output end portion of the bimetallic coil and an output shaft connected thereto, preferably by spot-welding.

Figure 2:
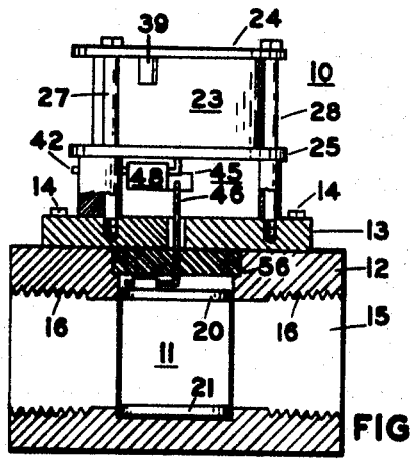
FIGURE 2 is a cross-sectional view of the valve housing and the sub-plate of FIGURE 1, taken along the line 2—2 thereof, the actuating mechanism including the hollow sleeve in which the bimetallic coil is mounted being shown in full (unsectioned)
Figure 1:
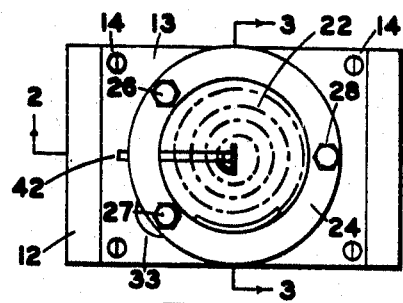
FIGURE 1 is a plan view of a butterfly valve embodying the features of my invention, showing principally a top end view of the bimetallic coil having an inner power output end portion and an outer adjustably stationary end portion mechanically shown in double lines, with the intermediate portion of the coil shown diagrammatically by a dash-dot line.
Figure 3:
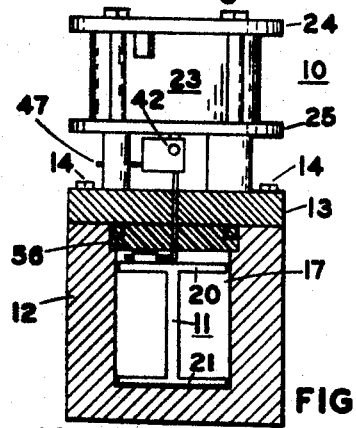
FIGURE 3 is a cross-sectional view of the valve housing and the sub-plate of FIGURE 1, taken along the line 3—3 thereof, with the actuating mechanism including the hollow sleeve being shown in full, the same as that in FIGURE 2.

With reference to the drawing, my actuating mechanism, identified by the reference character 10, is disposed to actuate a butterfly valve element 11 mounted in a valve housing 12 of a butterfly valve which may be used to control or regulate the flow of gas to a burner. The actuating mechanism 10 may be mounted on a sub-plate 13 which, in turn, may be removably fastened to the valve housing 12 by means of fastening screws 14. Thus, the actuating mechanism 10 and the sub-plate may be removed as a unit from the valve housing 12. As illustrated, the valve housing 12 has a lengthwise bore 15 extending therethrough, preferably provided with female pipe threads 16 for connecting the valve housing 12 to a supply of gas and to a gas burner. Extending crosswise of the valve housing 12 is a cross-bore 17 in which the butterfly valve element 11 is mounted for controlling or regulating the flow of gas through the lengthwise bore 15. As shown best in FIGURE 7, the butterfly valve element 11 has circular disks 20 and 21 provided on the opposite ends thereof and these disks function as bearings to center the butterfly valve element 11 in the cross-bore 17.

Figure 4:
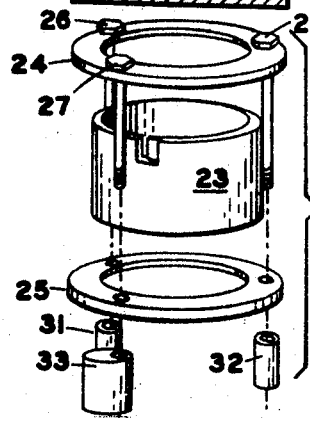
FIGURE 4 is an exploded view showing principally the hollow sleeve in which the bimetallic coil is mounted, including the end washers and the connecting bolts.
Figure 7:
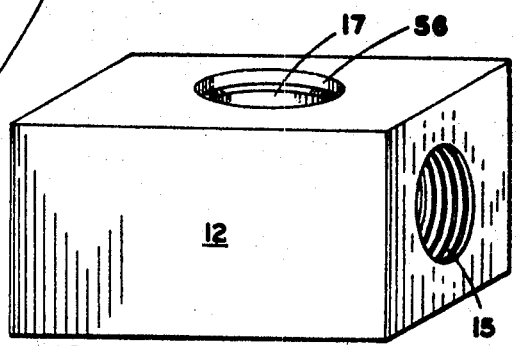
FIGURE 7 is an exploded view, partly diagrammatical, of my actuating mechanism in conjunction with the butterfly valve, showing principally the interlinkage between the bimetallic coil and the butterfly valve element.

The actuating mechanism 10 comprises, generally, a bimetallic coil 22, a hollow sleeve 23 in which the coil is mounted, and a train of driving parts for interconnecting the bimetallic coil to the butterfly valve element, see FIGURE 7. The hollow sleeve 23 is mounted for rotation with respect to the valve housing. In this mounting, the sleeve 23 is disposed between two end washers 24 and 25 held together by three bolts 26, 27 and 28 which closely extend along the outside of the sleeve 23. The three bolts define a circle in which the sleeve 23 may be rotated. As illustrated in FIGURE 4, the three bolts provide for connecting the sleeve 23 and the two washers 24 and 25 to the sub-plate 13. The bottom washer 25 is adapted to be spaced from the sub-plate 13 by means of two hollow tubes 31 and 32 and an eccentric stop 33 through which the three bolts respectively extend. The openings in the two opposed washers 24 and 25 are about the same size as the opening in the hollow sleeve 23. With the three bolts slightly unloosened, the hollow sleeve 23 may be adjustably rotated in an angular direction relative to the valve housing 12.

Figures 5, 6:
FIGURE 5 is a fragmentary perspective view of the outer end portion of the bimetallic coil and an edge portion of the hollow sleeve, showing principally a bent tongue and slot connection by which the outer end of the bimetallic coil is connected to the inside of the hollow sleeve.
FIGURE 6 is an enlarged fragmentary cross-sectional view of FIGURE 5, taken along the line 6—6 thereof, showing the bent tongue and slot connection by which the outer end of the bimetallic coil is connected to the inside of the hollow sleeve.

As illustrated best in FIGURE 7, the bimetallic coil has an inner (power output) end portion 34 and an outer (adjustably stationary) end portion 35, with an intermediate portion therebetween which, for simplicity in making the drawing, is identified by a dash-dot line. Upon changes in temperature the inner power output end portion 34 moves relative to the outer adjustably stationary end portion 35 for turning the butterfly valve element 11. The construction by which the outer end portion 35 is connected to the inside of the hollow sleeve 23 is shown in FIGURES 5 and 6. In this construction, a side portion 36 of the hollow sleeve is provided with a slot 37 and an adjacently disposed side recess 38 into which a bent or hooked tongue 39 on the outer end portion 35 of the bimetallic coil may be bent and fastened, see FIGURE 6. The hooked tongue 39, after being bent, fits into the side recess 38, whereby the outer surface of the bent tongue lies within the circumference of the outside wall of the hollow sleeve 23. In this manner, the bent tongue 39 does not interfere with the rotation of the sleeve within the three bolts 26, 27, and 28.

The inner power output end 34 of the bimetallic coil may be provided with an actuating rod 40. As shown in FIGURES 7 and 8, the actuating rod 40 has an axially extending portion 41, preferably spot-welded to the inner end portion of the bimetallic coil and constitutes power output means for the coil. The rod 40 also has substantially a radially extending swinging arm portion 42 which swings between the hollow tube 31 and the eccentric stop 33 which limit the thermal movement of the bimetallic coil. By slightly unloosening the three bolts, the eccentric stop 33 may be positionably rotated to vary the spacing between the hollow tube 31 and the eccentric stop 33, between which the movement of the swinging arm portion 42 is limited.

The swinging arm portion 42 also constitutes a part of a universal drive indicated by the reference character 45 from which extends a wire-shaft 46 having a bent shaft portion 47 extending substantially perpendicular to the swinging arm 42 and constituting another part of the universal drive 45. A torque transmitting body 48 constitutes a third part of the universal drive 45 and is provided with two elongated apertures 49 and 50, substantially perpendicular to each other, through which the swinging arm 42 and the bent shaft portion 47 respectively and slidably extend. The universal drive 45 transmits torque from the rod 40 to the wire-shaft 46 and in addition its function is to accommodate for axial misalignment between the rod 40 and the wire-shaft 46. As the bimetallic coil flexed under temperature changes, there is a tendency for the axially extending portion 41 of the rod 40 to shift off-center in a radial direction and thus to become axially misaligned with the wire-shaft 46. The body 48 of the universal joint is made of plastic material, preferably Teflon to provide low sliding friction with the swinging arm 42 and the bent shaft portion 47.

From the universal drive 45, the wire-shaft 46 extends through an aperture 53 in the sub-plate 13 and then passes through a shaft-bore 54 in a circular disk sealing member 55 mounted into a stepped counterbore 56 at the entrance of the crossbore 17 in the valve housing 12. The periphery of the sealing member 55 is provided with a stepped shoulder 57 into which an O-ring 58 may be mounted for making a fluid seal with the valve housing 12. The sub-plate 13 holds the O-ring in the stepped shoulder 57. The inner end of the wire-shaft 46, after passing through the shaft-bore 54, is provided with a bent actuating portion 59 slidably fitting into an opening 60 in a boss 61 integrally formed on the side of the circular disk 20 of the butterfly valve element 11.

The wire-shaft is resistingly twistable whereby it may be twisted to adjustably position the butterfly valve element 11 in an angular direction with the power output rod 40 connected to the inner end of the bimetallic coil 22.

The wire-shaft is preferably made of a stainless steel wire having a diameter residing in a range of approximately .025 to .070 of an inch. A wire with a diameter of approximately .040 of an inch is preferably satisfactory. In this invention, the shaft-bore 54 through which the wire-shaft 46 passes constitutes a fluid seal for the wire-shaft and is preferably provided by piercing the plastic (Teflon) disk 55 by a point on the end of the wire-shaft before the ends thereof are bent. The friction of the wire-shaft 46 in the pierced shaft-bore 54 is relatively low because the diameter is relatively small and enables the shaft to be readily operable by the bimetallic coil upon changes in temperature. The thickness of the plastic sealing disk 55 through which the shaft-bore 54 passes may reside in a range from approximately $1/16$ to $1/4$ of an inch, preferably of about $1/8$ of an inch. Teflon, when pierced, has a flow-back characteristic which makes a good fluid seal with the wire-shaft 46. The flow-back of the Teflon for small wire diameters provides a relatively low rotational drag on the wire-shaft which enables the bimetallic coil to turn the butterfly valve element 11 for controlling or regulating the gas flow through the valve. The piercing operation for making the fluid seal for the wire-shaft insures that the shaft-bore 54 has substantially a cylindrical inner surface self-matching the diameter of the wire. A good fluid seal is thus provided.

In explaining the adjustments and the operation of my invention, let it be assumed that at zero temperature, the butterfly valve element 11 is stopped at full open position and the burner is at high flame and that at 60 degree temperature, which is adjustably optional, the valve element is adjustably stopped at about 90 percent closed position, where the burner is at low flame.

The length of bimetallic coil is such that it will turn the butterfly valve element from full open position to the 90 percent closed position for a temperature change from zero to 60 degrees. The adjustments are made in the manufacture and assembly of the valve. After the adjustments are once set in assembly, there is no further need to reset them. At zero degree temperature, the hollow sleeve is rotated until the swinging arm just hits the tube 31, after which the three bolts may be then tightened. Thus, the tube 31 acts as a stop for the low limit of temperature range. At this zero temperature adjustment of the swinging arm 42, the butterfly valve element 11, through variations in manufacturing tolerances may not be exactly at full open position. However, the butterfly valve 11 may be adjustably positioned at the full open position by the simple act of twisting the wire-shaft 46. This may be done by twistingly turning the butterfly valve element by manipulating one's fingers extending in the lengthwise bore 15 and at the same time holding the swinging arm 42 against the stop tube 31. At 60 degree temperature, the eccentric stop 33 may be rotated until it just engages the swinging arm 42, which, at 60 degree temperature, will have been rotated by the bimetallic coil to a position where the butterfly valve element is at the 90 percent closed position. In adjusting the eccentric stop 33, the three bolts may be slightly unloosened. When once set, the three bolts may be re-tightened. The eccentric stop 33 acts as a stop for the high limit of temperature range.

The 60 degree temperature is optional for the 90 percent closed position. In fact, the 90 percent relatively closed position of the butterfly valve element for the low flame condition is also optional. Thus the high temperature limit may be at a value other than 60 degrees and the relatively closed position of the butterfly valve element may be at an angle other than the 90 percent relatively closed position. Also, the low temperature limit may be at a value other than at zero degree. The adjustments provided on my valve will accommodate a large number of optional settings, giving the valve a wide range of commercial usage.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Actuating mechanism for a rotary device, said rotary device having a housing and rotary means mounted therein, seal means including a body of Teflon material for sealing said rotary means in said housing, said body of Teflon material having a shaft-bore, a rotary shaft for operating said rotary means, said shaft comprising a resistingly twistable piece of wire extending through said shaft-bore and having an external shaft portion disposed for actuation, said wire having a diameter residing in a range of approximately .025 to .070 of an inch, power means disposed externally of said housing for actuating said external shaft portion, rotational support means carried by said housing to which said power means may be mounted, said rotational support means comprising substantially a hollow sleeve mounted for rotation relative to said housing, said power means being mounted inside of said hollow sleeve and having first and second means relatively movable with respect to each other in response to temperature, said first means including power output means, said second means including connection means for connecting said power means to said hollow sleeve, whereby rotation of said hollow sleeve relative to said housing causes rotation of said power output means independently of relative movement between said first and second means, torque transmitting means for connecting said power output means to said external shaft portion for operating said rotary means, said shaft-bore comprising substantially a cylindrical inner surface self-matching the diameter of said wire, said shaft-bore and said wire therein comprising a low friction shaft seal, said body of Teflon material having a marginal peripheral body portion, O-ring means for providing a fluid seal between said marginal peripheral body portion and said housing, and stop means carried by said housing for limiting the movement of said power means, said power output means being disposed substantially centrally of said hollow sleeve and substantially in general axial alignment with said external shaft portion.

2. The structure of claim 1, wherein said power means includes a bimetallic element having first and second end portions thermally relatively movable with respect to each other, said first end portion including said power output means, said second end portion including said connection means.

3. The structure of claim 2, wherein said bimetallic element comprises a coil with inner and outer end portions and wherein said inner end portion includes said power output means and said outer end portion includes said connection means.

References Cited

UNITED STATES PATENTS

| | | | |
|---|---|---|---|
| 839,803 | 1/1907 | Amsler | 64—15 |
| 1,289,104 | 12/1918 | Britton | 251—215 |
| 2,210,922 | 8/1940 | Joesting | 236—101 |
| 2,243,900 | 6/1941 | Fulcher | 64—15 |
| 2,499,779 | 3/1950 | Ray | 337—360 |
| 2,717,590 | 9/1955 | Stelle et al. | 236—101 X |
| 3,166,892 | 1/1965 | Sherwood | 60—23 |
| 3,404,530 | 10/1968 | Churchill et al. | 60—23 |

WILLIAM E. WAYNER, Primary Examiner

U.S. Cl. X.R.

60—23; 73—362.1; 251—308; 277—192; 310—4